US012174511B1

(12) United States Patent
Aroca

(10) Patent No.: US 12,174,511 B1
(45) Date of Patent: *Dec. 24, 2024

(54) MULTI-SECTION MISMATCHED MODULATOR FOR OPTIMAL POWER

(71) Applicant: Acacia Communications, Inc., Maynard, MA (US)

(72) Inventor: Ricardo Aroca, Maynard, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/554,202

(22) Filed: Dec. 17, 2021

Related U.S. Application Data

(60) Provisional application No. 63/131,673, filed on Dec. 29, 2020.

(51) Int. Cl.
*G02F 1/025* (2006.01)
*G02F 1/225* (2006.01)

(52) U.S. Cl.
CPC ............ *G02F 1/2255* (2013.01); *G02F 1/025* (2013.01); *G02F 1/2257* (2013.01); *G02F 2201/127* (2013.01)

(58) Field of Classification Search
CPC ...... G02F 1/2255; G02F 1/025; G02F 1/2257; G02F 2201/127
USPC ........................................................ 385/1–3
See application file for complete search history.

(56) References Cited

U.S. PATENT DOCUMENTS

| 2004/0052491 | A1* | 3/2004 | Otake | G02F 1/2257 385/131 |
| 2009/0148094 | A1* | 6/2009 | Kucharski | G02F 1/0121 385/2 |
| 2017/0248804 | A1* | 8/2017 | Sugamata | G02F 1/0327 |

OTHER PUBLICATIONS

"Optoelectronic integrated circuits incorporating negative differential resistance devices" by Figueiredo, Seon (Year: 2007).*

* cited by examiner

*Primary Examiner* — Robert Tavlykaev
(74) *Attorney, Agent, or Firm* — K&L GATES LLP

(57) ABSTRACT

Aspects of the present disclosure are directed to a multi-section mismatched modulator. In one embodiment, a segmented bias electrode is provided along the length of the optical waveguide in the optical modulator. Each segmented bias electrode may have a pre-determined bias voltage that can reduce impedance mismatches along the length of the signal electrode to reduce echoes and ripples in the modulation signal. In an embodiment implemented as a P-I-N diode modulator, the bias electrode is used to apply a reverse bias transversely to the section of the diode modulator between the bias electrode and the signal electrode. According to an aspect, RF impedance along the length of the signal electrode can be tuned by adjusting the magnitude of the reverse-bias point at different segments of the bias electrode, and be matched to a desirable impedance value to reduce reflection and ripple effects.

20 Claims, 4 Drawing Sheets

MULTI-SECTION MISMATCHED MODULATOR FOR OPTIMAL POWER

CROSS REFERENCE TO RELATED APPLICATIONS

This application claims priority to and the benefit of U.S. Provisional Application No. 63/131,673 filed on Dec. 29, 2020 the entire disclosure of which is incorporated by reference herein.

FIELD

The present application relates to optical modulators.

BACKGROUND

Optical modulators, sometimes referred to as electro-optic modulators, are optical devices that provide a modulated light signal based on an electrical input signal. Some optical modulators may be integrated into a photonic integrated circuit (PIC).

SUMMARY

Aspects of the present disclosure provide an optical modulator with linearly distributed active circuitry coupled to a signal electrode to compensate for loss or attenuation of a high frequency modulation signal in the signal electrode. In one embodiment, negative resistance cells are attached to the signal electrode at various points, and have tunable negative resistances to compensate for the loss. In another embodiment, a segmented bias electrode is provided along the length of the optical waveguide in the optical modulator. Each segmented bias electrode may have a pre-determined bias voltage that can reduce impedance mismatches along the length of the signal electrode to reduce echoes and ripples in the modulation signal. In some embodiments, an optical modulator is provided. The optical modulator comprises a signal input configured to receive a modulation signal; an optical waveguide extending along a first direction and configured to support a light signal; and a signal electrode coupled to the optical waveguide and elongated along the first direction. A first point along a length of the signal electrode is directly coupled to the signal input, and a second point along the length of the signal electrode is coupled to a negative resistance cell.

In some embodiments, a method for operating an optical modulator is provided. The optical modulator has an optical waveguide and a signal electrode both elongated along a first direction. The signal electrode is coupled to the optical waveguide at a plurality of contact points arranged along the first direction, to a signal input at a first point along a length of the signal electrode, and to a negative resistance cell at a second point along the length of the signal electrode. The method comprises applying a modulation signal at the signal input; transmitting a light signal along the first direction in the optical waveguide; and selecting a negative resistance of the negative resistance cell such that an attenuation of a voltage at a first contact point and a last contact point of the plurality of contact points is no more than 50% when the modulation signal has a frequency of between 30 MHz and 100 GHz.

In some embodiments, a silicon carrier-depletion modulator is provided. The silicon carrier-depletion modulator comprises a modulation driver configured to provide a modulation signal at a signal input; a silicon waveguide extending along a first direction and configured to support a light signal, the silicon waveguide coupled between a signal electrode and a bias electrode. The signal electrode is elongated along the first direction. A first point along a length of the signal electrode is directly coupled to the signal input, and a second point along the length of the signal electrode is coupled to a negative resistance cell.

In some embodiments, an optical modulator is provided. The optical modulator comprises an optical waveguide elongated along a first direction and configured to transmit a light signal along the first direction; a signal electrode coupled to a signal input configured to receive a modulation signal. The signal electrode is elongated along the first direction and coupled to the optical waveguide. The optical modulator further comprises a plurality of bias electrodes arranged along the first direction and coupled to the optical waveguide.

In one embodiment, a first bias electrode of the plurality of bias electrodes is configured to receive a first bias voltage, and wherein a second bias electrode of the plurality of bias electrodes is configured to receive a second bias voltage different from the first bias voltage.

In one embodiment, each of at least two bias electrodes is coupled to a respective bias terminal of a plurality of bias terminals, each bias terminal configured to provide a pre-determined bias voltage to the corresponding bias electrode. In one embodiment, each of at least two bias electrodes has a length along the first direction that is shorter than a length of the optical waveguide along the first direction. In one embodiment, each of at least two bias electrodes comprises a contact that is directly coupled to the optical waveguide at a plurality of bias contact points arranged along the first direction.

In one embodiment, a first point along a length of the signal electrode is directly coupled to the signal input, a second point along the length of the signal electrode is coupled to a compensation circuit. In one embodiment, a first bias electrode of the plurality of bias electrodes is aligned with the first point of the signal electrode along the first direction, and a second bias electrode of the plurality of bias electrodes is aligned with the second point of the signal electrode along the first direction. In one embodiment, a third point along the length of the signal electrode is coupled to a termination resistor, and wherein a third bias electrode of the plurality of bias electrodes is aligned with the third point of the signal electrode along the first direction.

In one embodiment, a third bias voltage at the third bias electrode is selected such that an impedance of a portion of the signal electrode at the third point is matched with an impedance of the termination resistor. In one embodiment, the second bias electrode has a second bias voltage, and a difference between the second bias voltage and the third bias voltage is selected such that a ripple amplitude at the signal input at a frequency of 5 GHz or above is decreased compared to when the difference is zero.

In one embodiment, the compensation circuit comprises at least one negative resistance cell. In one embodiment, the at least one negative resistance cell comprises a plurality of negative resistance cells coupled to a plurality of points along the length of the signal electrode. In one embodiment, the optical modulator further comprises an negative resistance driver coupled to the at least one negative resistance cell and configured to supply power to the compensation circuit. In one embodiment, the optical modulator further comprises a voltage driver coupled to the plurality of bias terminals and configured to generate the pre-determined bias voltages. In one embodiment, the voltage driver comprises a digitally controlled voltage supply circuit.

In some embodiments, a silicon carrier-depletion modulator is provided. The silicon carrier-depletion modulator comprises a modulation driver configured to provide a modulation signal at a signal input; a silicon waveguide extending along a first direction and configured to support a light signal, the silicon waveguide coupled between a signal electrode and a bias electrode. The signal electrode is elongated along the first direction and coupled to the signal input. The bias electrode comprises a plurality of segments arranged along the first direction and coupled to the silicon waveguide.

In some embodiments, a first segment of the plurality of segments is configured to receive a first bias voltage, and wherein a second segment of the plurality of segments is configured to receive a second bias voltage different from the first bias voltage. In some embodiments, each of at least two segments is coupled to a respective bias terminal of a plurality of bias terminals, each bias terminal configured to provide a pre-determined bias voltage to the corresponding segment. In some embodiments, the each of at least two segments has a length along the first direction that is shorter than a length of the silicon waveguide along the first direction. In some embodiments, each of at least two segments comprises a contact that is directly coupled to the silicon waveguide at a plurality of bias contact points arranged along the first direction.

In some embodiments, an optical modulator is provided. The optical modulator comprises an optical waveguide configured to transmit a light signal along a length of the optical waveguide and a signal electrode configured to receive a modulation signal. The signal electrode is elongated alongside the length of the optical waveguide and coupled to the optical waveguide. A first end of the signal electrode is coupled to a signal input, a second end of the signal electrode is coupled to a termination resistor having a tunable resistance. The optical modulator further comprises a multi-segment bias electrode having segments arranged alongside the length of the optical waveguide and coupled to the optical waveguide. Some or all segments of the multi-segment bias electrode are configured to each receive a bias voltage of a plurality of bias voltages. The plurality of bias voltages and the tunable resistance are selected such that a value of a characteristic of the light signal is within a predetermined range.

In one embodiment, a first segment of the plurality of segments is configured to receive a first bias voltage, and wherein a second segment of the plurality of segments is configured to receive a second bias voltage different from the first bias voltage. In one embodiment, each of at least two segments is coupled to a respective bias terminal of a plurality of bias terminals, each bias terminal configured to provide a pre-determined bias voltage to the corresponding segment. In one embodiment, each of at least two segments has a length along the first direction that is shorter than a length of the silicon waveguide along the first direction. In one embodiment, each of at least two segments comprises a contact that is directly coupled to the silicon waveguide at a plurality of bias contact points arranged along the first direction. In some embodiments, a method for calibrating an optical modulator is provided. The optical modulator has an optical waveguide, a signal electrode having a terminal end coupled to a tunable terminal resistance, and a multi-segment bias electrode. The method comprises providing a plurality of bias voltages to respective segments of the multi-segment bias electrode; providing a modulation signal to the signal electrode; monitoring a characteristic of a light signal transmitted through the optical waveguide; and iteratively adjusting one or more of the plurality of bias voltages and the terminal resistance such that a value of the monitored characteristic is within a predetermined range such that a value of the monitored characteristic is within a predetermined range.

BRIEF DESCRIPTION OF DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear. For purposes of clarity, not every component may be labeled in every drawing.

DETAILED DESCRIPTION

Figure 1:
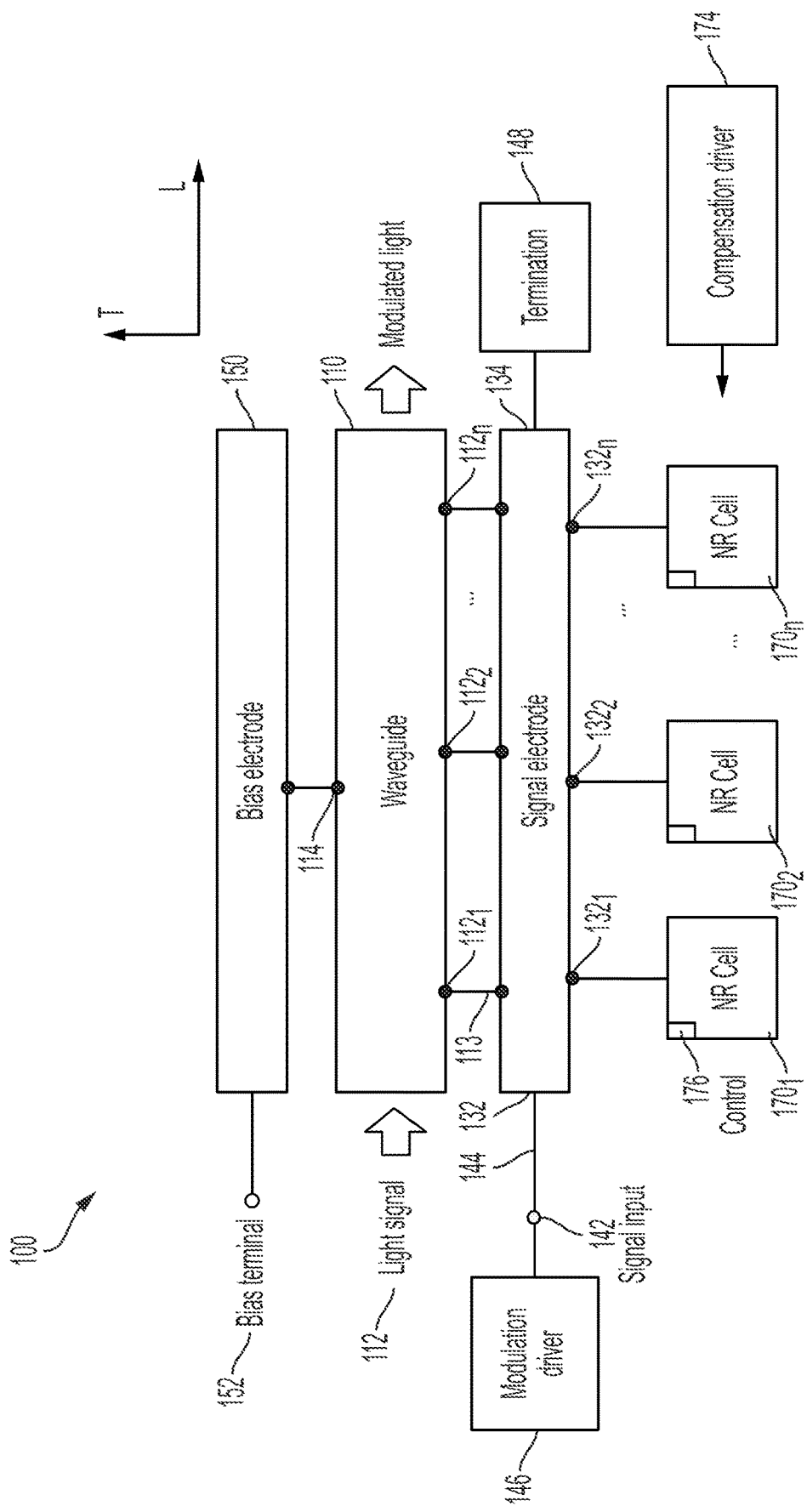
FIG. 1 is a high-level schematic diagram showing components of an optical modulator, in accordance with some embodiments.

Aspects of the present disclosure are directed to compensating modulation signal loss in an optical modulator using linearly distributed active circuitry coupled to a signal electrode.

Some optical modulators modulate a frequency or phase of a light signal supported in an optical waveguide that is elongated along a length direction of the optical waveguide. The modulation may be based on an electric field applied transversely to the optical waveguide between a signal electrode and a bias electrode. For example, the optical waveguide may comprise a carrier-depletion based diode structure with a carrier-depletion region that will change its optical characteristics depending on the transverse electric field across the carrier-depletion region. The transverse electric field may be based on a modulation signal, which is an electric signal, carried in the signal electrode that is coupled to the optical modulator. The signal electrode is elongated alongside the optical waveguide along the length direction, and carries the modulation signal from an input end to a terminal end.

In some embodiments, the signal electrode is coupled to the optical waveguide at multiple contact points along the length of the optical waveguide. The inventors have recognized and appreciated that when a high frequency radio frequency (RF) modulation signal is applied to the signal electrode, the modulation signal may be attenuated from various loss mechanisms from the first contact point to the last contact point down the length of the optical waveguide. For example, loss may be attributed to transverse currents at each contact point flowing through resistive semiconductor materials in the optical waveguide material, and becomes more pronounced the further down the length of the optical waveguide from the first contact point. The attenuation may not be as pronounced at low frequency, such as at 1 GHz or below, but when the modulation signal has a high frequency of more than 30 MHz for example, significant loss of the modulation signal may be observed. The loss from attenuation of modulation signal may cause a non-uniform modulation of the light signal at different sections of the optical waveguide, and lead to reduced optical modulator performance.

Aspects of the present disclosure provide apparatus and methods to compensate the modulation signal loss by coupling active circuitry to the signal electrode. According to one aspect, a first point on the signal electrode is directly coupled to a signal input to receive the modulation signal, and a negative resistance (NR) cell is attached to a second point on the signal electrode that is different from the first point. The NR cell comprises active circuitry, and may be additionally coupled to one or more power supply voltages. The inventors have recognized and appreciated that an NR cell behaves as a negative resistance which when coupled to the second point compensates for losses when the modulation signal propagates along the length of signal electrode from the first point to the second point.

In some embodiments, the negative resistance of the NR cell is tunable. The negative resistance may be selected such that an attenuation of a signal amplitude from the first contact point and the last contact point on the optical waveguide is no more than 50% when the modulation signal has a frequency of more than 30 MHz, for example between 30 MHz and 100 GHz.

In some embodiments, more than one NR cell may be provided as part of an optical modulator. The optical modulator may have a plurality of NR cells linearly distributed along the signal electrode, each NR cell coupled to a different point along the length of the signal electrode. The NR cells may be separately tuned to have negative resistance values such that the attenuation of signal amplitude may be compensated. Because the NR cells counter the loss mechanism at various points in the signal electrode, a number of NR cells can be distributed along the signal electrode while being independent from the driver circuitry that generates the modulation signal. In some embodiments, such a configuration simplifies circuit design.

Having described the aspect of loss compensation for modulation signals, another aspect of the present disclosure is directed to improving the frequency response of the modulation signals by matching impedance at different locations along the optical waveguide in the optical modulator. The inventors have recognized and appreciated that a mismatch in impedance along the length of the signal electrode may cause reflections and ripples that undesirably reduce the signal amplitude within a certain frequency range. Effects on signal amplitude from impedance mismatch may represent a large portion of attenuation particularly when other loss mechanisms have been mitigated, for example using compensation techniques described above. It is further desirable to match the impedance of the signal electrode(s) across the length from the input end coupled to the signal input, to the terminal end coupled to a terminal resistor. The inventors have recognized and appreciated that rather than modifying the shape and/or material of the optical waveguide at various locations, a segmented bias electrode may be used. In some such embodiments, each segment of the segmented bias electrode has a respective bias voltage that can be programmed to be different.

In some embodiments, rather than a single bias electrode bearing one bias voltage, a plurality of segmented bias electrodes are provided along the length direction of the optical waveguide. Each segmented bias electrode may be coupled to a respective bias terminal that can provide a pre-determined bias voltage. In a P-I-N diode modulator, the bias electrode is used to apply a reverse bias transversely to the section of the diode modulator between the bias electrode and the signal electrode. The inventors have recognized and appreciated that RF impedance along the length of the signal electrode can be tuned by adjusting the magnitude of the reverse-bias point at different segments of the bias electrode, and be matched to a desirable impedance value to reduce reflection and ripple effects.

An aspect of the present disclosure is directed to providing multiple adjustable control parameters in an optical modulator. The multiple adjustable control parameters may allow for optimizing modulator performance. In some embodiments, the tunable negative resistance values for the NR cells coupled to the signal electrode, the bias voltages on the segmented bias electrode, as well as the termination resistance may be provided as control parameters that are separately tunable using drivers within the optical modulator device. An optical modulator according to aspects of the present disclosure may provide adjustability to multiple control parameters that can facilitate optimization of performance of the optical modulator even after the optical modulator has been manufactured.

In some embodiments, the bias voltages applied to some or all segments of a multi-segment bias electrode may be iteratively adjusted, such that a measured characteristic of the light signal supported in the optical waveguide can be optimized. As a non-limiting example, a bit error rate (BER) can be monitored and maximized while the bias voltages at the segmented bias electrodes are adjusted. In addition, the tunable negative resistance for one or more NR cells coupled to the signal electrode may be iteratively adjusted to maximize the measured characteristic. Furthermore, the resistance of the termination resistor may be iteratively adjusted while the measured characteristic is maximized.

The aspects and embodiments described above, as well as additional aspects and embodiments, are described further below. These aspects and/or embodiments may be used individually, all together, or in any combination of two or more, as the disclosure is not limited in this respect.

FIG. 1 is a high-level schematic diagram showing components of an optical modulator 100, in accordance with some embodiments. In FIG. 1, optical waveguide 110 extends along a longitudinal direction L to support light signal 112. Optical waveguide 110 is formed of a semiconductor material, and has a length of between 1 and 10 mm and in some examples between 3 and 4 mm. In some embodiments, optical waveguide 110 may be a silicon waveguide and comprise a silicon waveguide core.

Signal electrode 130 is formed of a conductive material such as a metal or metal alloy, and is disposed alongside optical waveguide 110 and is elongated along the longitudinal direction L. Signal electrode 130 is directly coupled to a signal input terminal 142 at a first point 132 to receive a modulation signal 144 provided by a modulation driver 146 at the signal input terminal 142. The first point 132 may be a physical portion of the signal electrode 130 that is connected to signal input 142, for example via additional conductors as interconnection wiring. In a non-limiting example, first point 132 is an input end of the signal electrode 130, and a terminal end 134 is coupled to a terminal resistor 148. It should be appreciated that it is not required for the signal input and terminal resistor to be connected to the terminating ends of signal electrode 130, and conductors in the signal electrode may extend beyond the points where the signal input and terminal resistors make contact. Signal electrode 130 is coupled to optical waveguide 110 at a plurality of contact points $112_1, 112_2, \ldots 112_n$ by conductors 113.

In FIG. 1, a bias electrode 150 is elongated along the longitudinal direction L and is coupled to the optical waveguide 110 at a bias point 114 on the optical waveguide 110. The bias electrode 150 is coupled to bias terminal 152, which provides a constant bias voltage having a pre-determined bias voltage value. The bias electrode 150 and signal electrode 130 apply the bias voltage and modulation signal at two sides of the optical waveguide 110 along the transverse direction T. In some embodiments, optical waveguide 110 may be a carrier-depletion modulator that comprises a P-I-N diode structure with the P-I and I-N junctions in planes that are parallel to the longitudinal direction. In such embodiments, bias electrode 150 is used to reversely bias the diode structure, such that a carrier depletion region is maintained in the diode. As a non-limiting example, when the bias electrode is coupled to the cathode (N) side of the diode structure in the optical waveguide and has a bias voltage of 4V, and when the modulation signal in the signal electrode has a direct-current (DC) component of 3V, a reverse bias of −1V is applied to the diode structure in the transverse direction.

During operation, optical modulator 100 modulates the light signal 112 that is supported in the optical waveguide 110 based on the high frequency modulation signal 144. In some embodiments, signal electrode 130 is a RF transmission line that transmits the modulation signal 144 down the length of the signal electrode. The inventors have recognized and appreciated that when modulation signal 144 has a relatively low frequency of 1 GHz or less, there is a very small amount of loss in the modulation signal. When the modulation signal frequency is more than 30 MHz, for example between 30 MHz and 100 GHz, there can be significant modulation signal attenuation in the signal electrode if no compensation mechanism is provided. For example, at 1 GHz, a peak-to-peak voltage $V_{pp}$ of 4V at the signal input 142 will appear generally as a modulation signal with 4V peak-to-peak at each of the contact points $112_1$, $112_2$ to $112_n$. However, at 30 MHz or above, $V_{pp}$ decreases at contact point $112_n$. Depending on the details of the optical modulator implementation, attenuation may lead to for example a $V_{pp}$ at contact point $112_n$ of less than 1V. The attenuation may be attributed to losses at each contact point such as $112_1$ where electric current flows transversely through resistive semiconductor material within the optical waveguide 110.

Still referring to FIG. 1. In optical modulator 100, NR cells $170_1, 170_2, \ldots 170_n$ are coupled to respective points $132_1, 132_2, \ldots 132_n$ of the signal electrode 130. The NR cells are active circuitry that are coupled to linearly distributed points along the length of signal electrode 130 to compensate for the attenuation of the modulation signal. Although more than one NR cell is illustrated, it should be appreciated that it is not a requirement and that any number of one or more NR cells may be used.

NR cell 170 may have a tunable negative resistance that can be set for example by a voltage at control terminal 176. The negative resistance, when coupled to the signal electrode 130 at point 132, may counter the resistive loss in adjacent portions of the signal electrode. The NR cell 170 may implemented using any negative resistance circuitry known in the field, and in some embodiments may comprise active and passive components that form an equivalent impedance that has a minimal reactance or a reactance that is designed into or absorbed by the transmission line, and a negative resistance.

Referring again to FIG. 1, each NR cell 170 is powered by a compensation driver 174 that provides one or more supply voltages to the NR cell. Compensation driver 174 may also be coupled to the control terminals 176 in each NR cell 170 to program the negative resistance. Notably, each NR cell is coupled to a point 132 on the signal electrode that is separated from the signal input 142 by at least a portion of a length of the signal electrode, and is not directly to the signal input to receive the modulation signal as provided by the modulation driver 146. As the NR cell is designed to counter the resistive loss, the actual amplitude of the modulation signal at the point where the NR cell is connected to is not important. There is no requirement that the NR cell be connected to output of the modulation driver, the NR cell and the compensation driver can be designed independently from the design of the modulation driver, which advantageously simplifies the circuit design. As another advantage, the number of NR cells can be increased or decreased in circuit design to provide loss compensation for optical modulators having different lengths. Furthermore, as the NR cells and compensation driver are independent from the modulation driver, the NR cells and compensation driver may be implemented in a variety of ways. For example, they may be implemented in a separate semiconductor substrate that is connected to a PIC substrate containing the modulation driver and the optical waveguide, or alternatively the NR cell and compensation driver may be integrated within the same PIC substrate.

The negative resistance for some or all of the NR cells 170 may be tunable at their control terminals 176, and selected such that an attenuation of a signal amplitude from the first contact point $112_1$ and the last contact point $112_n$ on the optical waveguide is no more than 50% when the modulation signal has a frequency of more than 30 MHz, for example between 30 MHz and 100 GHz. Using the non-limiting example mentioned above, at 40 GHz, if there is a peak-to-peak voltage $V_{pp}$ of 4V at the first contact point $112_1$, the NR cells may be tuned such that there is at least 2V $V_{pp}$ at contact point $112_n$ of the optical waveguide.

Figure 2:
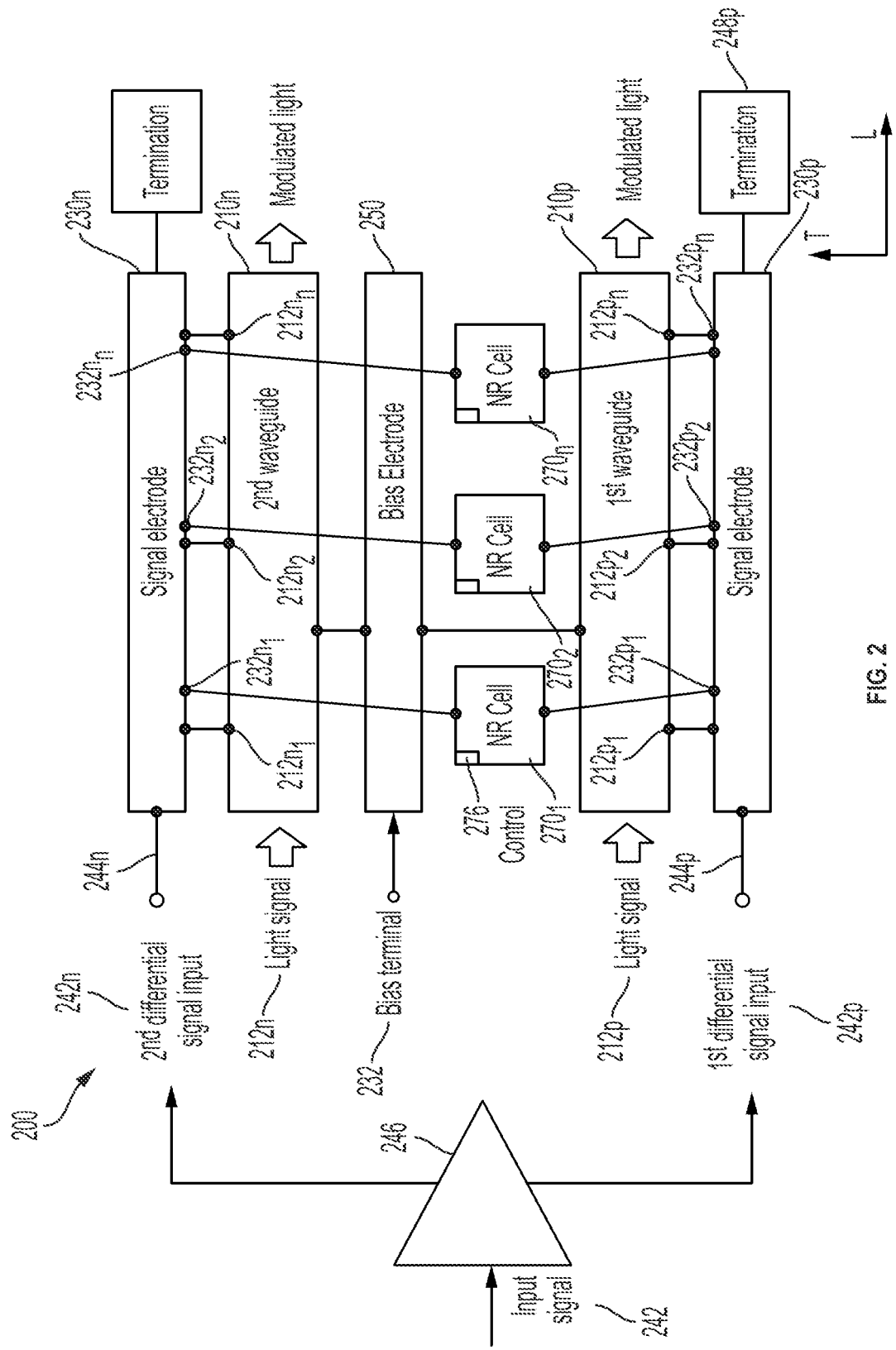
FIG. 2 is a high-level schematic diagram showing components of an optical modulator in a differential configuration, in accordance with some embodiments.

The optical modulator 100 shown in FIG. 1 has a single-ended configuration, where light signal 112 is modulated within optical waveguide 110 based on a single modulation signal 144. FIG. 2 is a high-level schematic diagram showing components of an exemplary optical modulator 200 in a differential configuration, in accordance with some embodiments.

FIG. 2 shows a differential optical modulator 200 that has two waveguides $210n$, $210p$ that modulate respective light signals $212n$, $212p$ based on a respective differential signal $244n$, $244p$ that represent an input signal 242. Each of first and second waveguides $210n$, $210p$ extends along the longitudinal direction. A differential driver 246 generates the first differential signal $244p$ and the second differential signal $244n$ at the first differential signal input $242p$ and the second differential signal input $242n$, respectively. The first waveguide $210p$ is coupled to a first differential signal electrode $230p$ and a bias electrode 250. The second waveguide $210n$ is coupled to a second differential signal electrode $230n$ and the bias electrode 250.

In FIG. 2, a first point of the first differential signal electrode $230p$ is directly coupled to the first differential signal input $242p$, while a terminal end of the first differential signal electrode is directly coupled to a terminal resistor $248p$. A first point of the second differential signal electrode 230n is directly coupled to the second differential signal input 242n, while a terminal end of the second differential signal electrode is directly coupled to a terminal resistor 248n.

Still referring to FIG. 2, a plurality of NR cells 270 are provided and connected to points on the two differential signal electrodes to compensate for losses in the differential signals 244n, 244p. In some embodiments, rather than each NR cell coupling to a signal electrode, an NR cell can connect between a pair of points on the two differential signal electrodes, or "straddle" both differential signal electrodes. For example, NR cell $270_1$ may straddle between point $232p_1$ on the first differential signal electrode 230p, and point $232n_1$ on the second differential signal electrode 230n. Similarly, each of NR cells $270_2$ . . . $270n$ may be coupled between a respective pair of points ($232p_2$, $232n_2$) . . . ($232p_n$, $232n_n$) on the two differential signal electrodes.

Still referring to FIG. 2, the first differential signal electrode 230p is connected to contact points $212p_1$, $212p_2$, . . . $212p_n$ on the first waveguide 210p. The first differential signal electrode 230p is connected to contact points $212p_1$, $212p_2$, . . . $212p_n$ on the first waveguide 210p. In some embodiments, some or all of the negative resistance values for the NR cells 270 may be adjusted such that attenuation of the differential signal amplitudes down the length of the differential waveguides is reduced.

Figure 3:
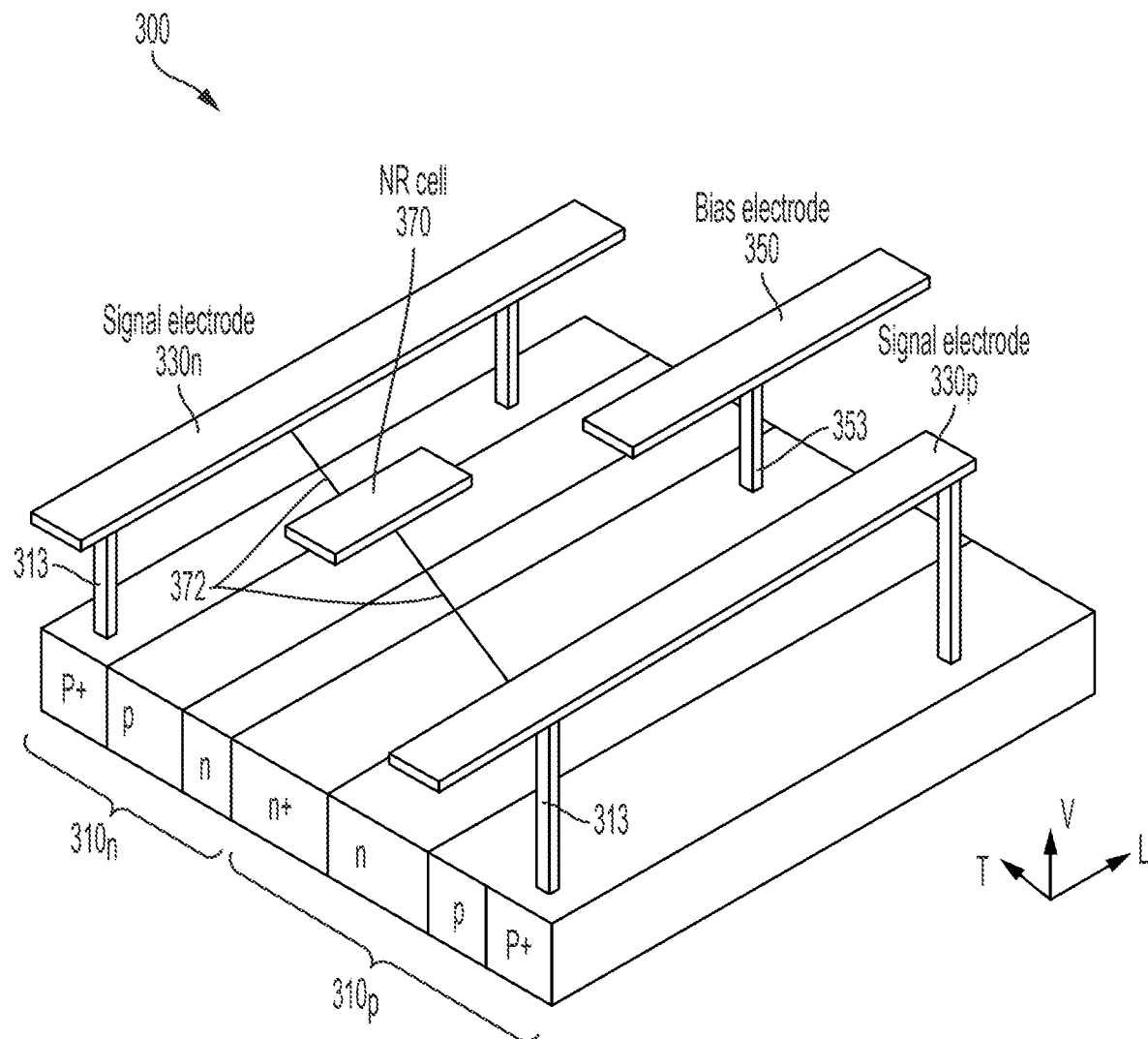
FIG. 3 is a schematic diagram showing a plan view of components of another optical modulator, in accordance with some embodiments.

FIG. 3 is a schematic diagram showing a plan view of components of an exemplary optical modulator 300, in accordance with some embodiments. Optical modulator 300 may be an exemplary implementation of optical modulator 200 as shown in FIG. 2. As shown in FIG. 3, optical modulator 300 includes a first waveguide 310p driven by a first differential signal in the first signal electrode 330p, and includes a second waveguide 310n driven by a second differential signal in the second signal electrode 330n. In some embodiments, the two waveguides 310p, 310n may be two arms of a Mach-Zehnder modulator (MZM), and the differential signals in the first and second signal electrodes 330p, 330n are differential signals that represent a modulation signal, and are generated in a modulation driver (not shown).

First waveguide 310p is a silicon carrier-depletion modulator for supporting a light signal along the longitudinal direction L, and includes a plurality of portions that are disposed along the transverse direction T. In the example shown in FIG. 3, the first waveguide 310p includes portions labelled p+, p, n and n+, representing the type and relative concentration of the dopants within each portion. It should be appreciated that the order and number of portions illustrated in the first waveguide 310p are for illustrative purpose only and embodiments of the present disclosure are not so limited and there can be additional portions having appropriate doped or intrinsic characteristics provided in the first waveguide 310p. In one example, the first modulator may comprise an intrinsic portion that forms part of a P-I-N diode structure in the transverse direction.

Referring to FIG. 3, multiple contact points of the p+ portion of the first waveguide 310p are coupled to the first signal electrode 330p via respective conductors 313. The n+ portion of the first waveguide 310p is coupled to the bias electrode 350 via conductor 353. While only two conductors 313 and one conductor 353 are shown, it should be appreciated that any number of conductors may be provided to interconnect the first waveguide 310p with the first signal electrode 330p and bias electrode 350. It should also be appreciated that the bias electrode 350 and signal electrodes 330p, 330n extend along the length of first waveguide 310p and second waveguide 310n, and that only a portion of the bias electrode 350 may be illustrated in FIG. 3. When a bias voltage is applied to the bias electrode 350, the P-N junction between the p and n portions of the first waveguide 310p is reversely biased against the first signal electrode 330p, with a carrier concentration within a carrier-depletion region of the P-N junction being modulated by the signal carried in the first signal electrode 330p.

Referring still to FIG. 3, multiple contact points of the p+ portion of the second waveguide 310n are coupled to the second signal electrode 330n via respective conductors 313. The n+ portion of the second waveguide 310n is coupled to the bias electrode 350 via conductor 353. In the example shown, the first and second modulators share a common n+ portion and a common bias electrode, while aspects of the present disclosure are not so limited.

In FIG. 3, NR cell 370 is coupled to respective points of the first signal electrode 330p and second signal electrode 330n to compensate for modulation signal loss. While only one NR cell is shown, it should be appreciated that any number of NR cells may be provided. In some embodiments, a plurality of NR cells are linearly distributed along the length of the first and second waveguides 310p, 310n, and each NR cell straddles a pair of points along the length of respective signal electrodes.

In some embodiments first and second waveguides 310p, 310n may be silicon slab waveguides fabricated on a silicon substrate. Modulation drivers that supply differential signals to drive the first and second waveguides may be provided in a separate substrate, or in some embodiments may be fabricated on the same silicon substrate as first and second waveguides. Signal electrodes 330n, 330p and bias electrode 350 may be disposed in the PIC in a T-L plane that is vertically offset from the waveguides with conductors 313 and 353 being vertical conductive structures as shown in FIG. 3. However, it should be appreciated that the arrangement as illustrated is by way of example only, and the electrodes and interconnection conductors may be disposed above, below, or coplanar in the T-L plane where the waveguides 310p, 310n are disposed. Although not shown, any suitable type and amount of dielectric material may additionally be provided in the PIC to provide electrical isolation, optical index matching, and mechanical encapsulation.

The NR cells 370 shown in FIG. 3 are coupled to signal electrodes 330n, 330p via interconnections 372, and are independent from the modulation driver. It should be appreciated that interconnections 372 are depicted as straight lines in FIG. 3 solely for purpose of illustration, and that interconnections 372 may comprise any type of conductive material, and may be of any suitable shape and size for making electrical interconnections. The electrical interconnections may allow transmission of both alternative current (AC) and direct current (DC) signals. In some embodiments, one or more impedance components such as one or more capacitors may be provided in a signal path between an NR cell and a corresponding signal electrode to for example mitigate parasitic loading effects. In some embodiments, the waveguides, signal electrodes, bias electrode and modulation driver circuitry are formed in a first substrate, and NR cells may be implemented as active circuitry in a second substrate separate from the first substrate. The second substrate may be disposed vertically above and bonded to the first substrate, and comprise conductive structures that interconnect the NR cells with respective points on the signal electrodes in the first substrate. In some embodiments, compensation driver circuitry for the NR cells may also be provided in the second substrate. It should be appreciated that the configuration for the NR cells as shown in FIG. 3 is for illustrative purpose only and aspects of the present disclosure are not so limited. For example, NR cells may be located in the same substrate as waveguides $310n$, $310p$, and interconnected with the signal electrodes using any suitable interconnection designs.

It should be appreciated that FIG. 3 may represent a portion of an optical modulator. That is, the components may extend further longitudinally and/or transversely in the figure, and structures in addition to those shown may be included.

Figure 4:
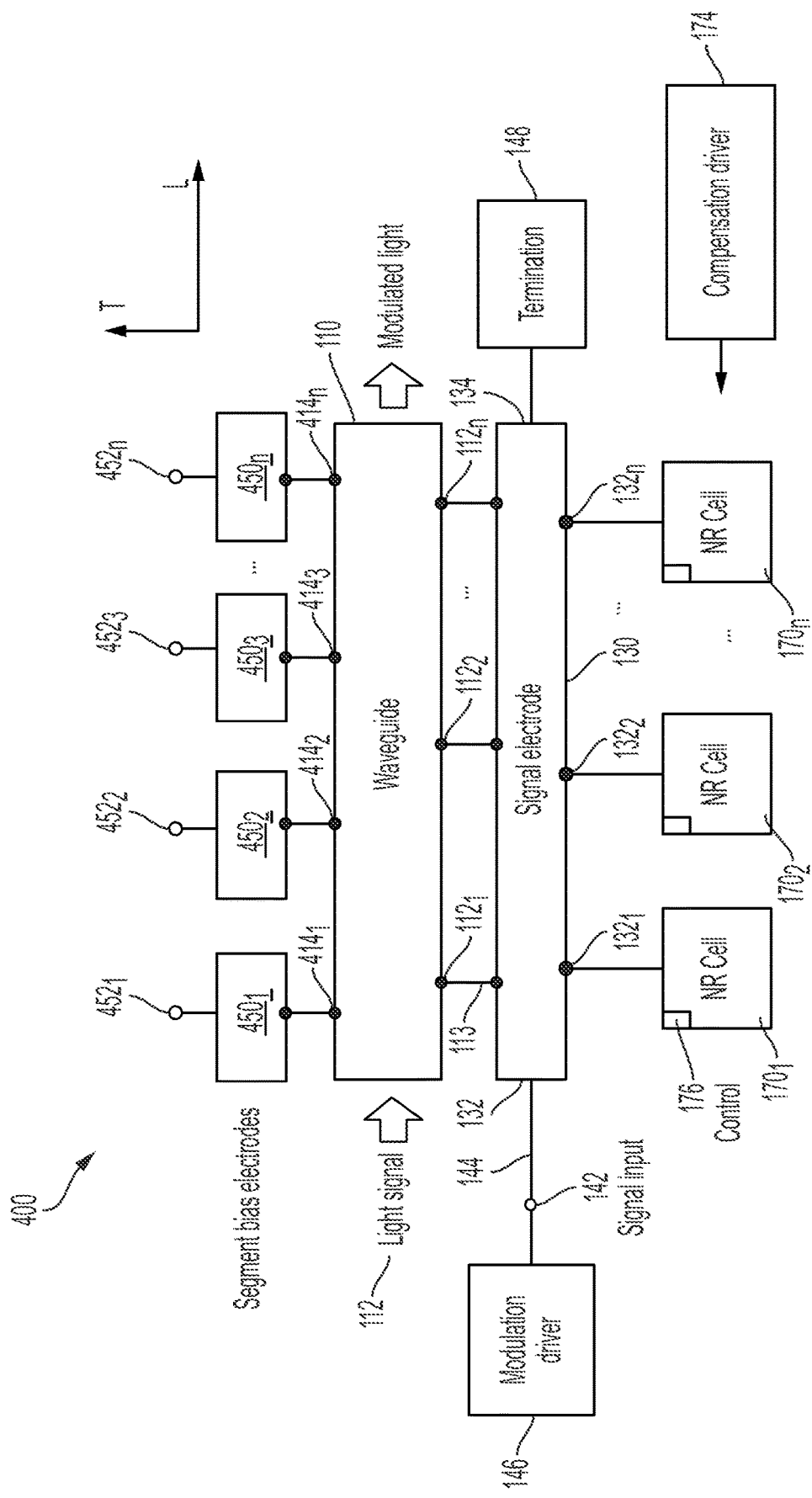
FIG. 4 is a high-level schematic diagram showing components of an optical modulator that is a variation of the optical modulator shown in FIG. 1, but with multiple segmented bias electrodes, in accordance with some embodiments.

FIG. 4 is a high-level schematic diagram showing components of an exemplary optical modulator 400 that is a variation of the optical modulator shown in FIG. 1, but with multiple segmented bias electrodes, in accordance with some embodiments. Optical modulator 400 is similar to optical modulator 100 in many aspects and like components in FIG. 4 are marked with the same reference numbers.

In FIG. 4, optical modulator 400 has a plurality of segmented bias electrodes $450_1$, $450_2$, $450_3$ . . . $450_n$ that each is coupled to the optical waveguide 110 at one of a plurality of bias contact points $414_1$, $414_2$, . . . $414_n$ distributed along the length direction of the optical waveguide. Each segmented bias electrode 414 is coupled to one of a plurality of bias terminals $452_1$, $452_2$, $452_3$ . . . $452_n$. The bias terminals can provide one or more pre-determined bias voltages that can be different for each bias terminal.

According to an aspect of the present disclosure, in embodiments where optical waveguide 110 comprises a reverse biased diode structure, bias voltage at the last bias electrode $450_n$ may be programmed to select a reverse bias condition along the transverse direction in the section of the optical waveguide 110 adjacent bias contact point $414_n$. The reverse bias condition near bias contact point $414_n$ can be used to tune the RF characteristics of the semiconductor material in the optical waveguide 110, and in turn tune the RF impedance of the signal electrode 130 adjacent the terminal end 134 to match the impedance of terminal resistor 148. For example, when the terminal resistor has a resistance of $50\Omega$, bias voltage at bias electrode $450_n$ is adjusted such that the impedance of the signal electrode 130 is $50\Omega$ near the terminal end 134. The adjustment of bias voltages can be performed by measuring a characteristic of the RF signal transmission in signal electrode 130 as feedback to indicate whether there is impedance mismatch, as discussed in detail below.

The number of bias electrode segments along the length of the optical waveguide 110 can be any suitable number that is permissible during manufacturing, for example between 1 and 10, or between 2 and 20. Generally, the higher number of bias electrodes provides a finer tuning of impedance profile in the signal electrode 130 with less number of potential impedance discontinuities. In the example illustrated in FIG. 4, each segmented bias electrode 450 has a length shorter than the length of the optical waveguide 110. However, it should be appreciated that aspects of the present disclosure is not limited to how the bias electrode segments are shaped or arranged, as long as the bias contact points $414_1$, $414_2$, . . . $414_n$ are distributed along the length of optical waveguide 110 and transversely from the contact points $132_1$, $132_2$, . . . $132_n$ distributed to the signal electrode 130.

Aspects of the present disclosure are also directed to providing multiple adjustable control parameters in an optical modulator to control modulator performance. The multiple control parameters may have adjustable values set to optimize performance in some embodiments. In some embodiments, the tunable negative resistance values for the NR cells coupled to the signal electrode, the bias voltages on the segmented bias electrode, as well as the termination resistance may be provided as control parameters, or tunable parameters for a variety of control parameters vertically integrated into one modulator package, such that the performance of the optical modulator can be optimized in one package. The adjustments may be made from an programmable analog voltage, for example a bias voltage at a bias electrode segment may be tuned by adjusting the analog voltage applied at a corresponding bias terminal using a bias voltage driver, and similarly a control terminal of an NR cell may have a tunable analog voltage applied using a compensation driver, as discussed below. However, it should be appreciated that one or more of the adjustments made to the control parameters may be made digitally. For example, the terminal resistor may be a tunable resistor that is programmable digitally. In another example, a compensation driver may comprise a low dropout (LDO) power supply that digitally control the voltage applied to control terminals of each NR cell.

According to some embodiments, the control parameters in an optical modulator may be iteratively adjusted while monitoring a characteristic of a light signal transmitted through the optical waveguide of the optical modulator as feedback. In some embodiments, the adjustment may be performed as a calibration process during manufacturing, for example during a testing process after components in the optical modulator have been assembled. The set of parameters can be optimized such that the monitored characteristic is in a pre-determined range, before the optical modulator is shipped to a customer.

In some embodiments, the characteristic of the light signal to be optimized may be a BER, and the tunable negative resistances for the NR cells, may be iteratively adjusted to maximize the BER. The terminal resistance and bias voltages for the multi-segment bias electrode may also be iteratively adjusted based on the same monitored BER. Any suitable algorithm may be used to incrementally optimize multiple tunable parameters to achieve a maximized BER, and the order in which the different tunable parameters are adjusted during a calibration process is not limited.

In some embodiments, in addition to or as alternative of monitoring BER from transmitted light signals as feedback for adjustment, other techniques may be used to optimize bias voltages applied on the multi-segment bias electrode to reduce reflection and ripple effects in the signal electrode transmission line. A spectrum response may be measured at the input to the signal electrode, such as at signal input 142 shown in FIG. 4, and echoes shown in the spectrum response may be used to optimize the bias voltages. The adjustment may begin with a same bias voltage on all the bias electrode segments, followed by tuning of the bias voltage in a bias electrode segment closer to the end of the optical waveguide and the terminal end of the signal electrode, because the effect of bias voltage on impedance mismatch is more pronounced at the terminal end.

In one example, a ripple amplitude at the signal input at a frequency of 5 GHz or above may be monitored, and the individual bias voltages are iteratively adjusted to minimize the ripple amplitude. By such adjustment, the ripple amplitude is reduced compared to when the bias electrode is not segmented, or when all the segmented have the same bias voltage. Ripples in the signal electrode may be monitored by measuring an impulse response with a digital signal processor (DSP), although any suitable measurement technique may be used.

Having thus described several aspects of at least one embodiment of this technology, it is to be appreciated that various alterations, modifications, and improvements will readily occur to those skilled in the art.

Various aspects of the technology may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, aspects of the technology may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

What is claimed is:

1. An optical modulator, comprising:
   an optical waveguide elongated along a first direction and configured to transmit a light signal along the first direction;
   a compensation circuit;
   a signal electrode having a length, wherein the signal electrode is directly coupled to a signal input at a first point along the length of the signal electrode, the signal input configured to receive a modulation signal, the signal electrode elongated along the first direction and coupled to the optical waveguide, wherein a second point along the length of the signal electrode is coupled to the compensation circuit; and
   a plurality of bias electrodes arranged along the first direction and coupled to the optical waveguide, wherein each bias electrode of the plurality of bias electrodes has a pre-determined bias voltage configured to reduce impedance mismatches along the length of the signal electrode,
   the compensation circuit configured to reduce the attenuation of the modulation signal.

2. The optical modulator of claim 1, wherein a first bias electrode of the plurality of bias electrodes is configured to receive a first bias voltage, and wherein a second bias electrode of the plurality of bias electrodes is configured to receive a second bias voltage different from the first bias voltage.

3. The optical modulator of claim 1, wherein each of at least two bias electrodes is coupled to a respective bias terminal of a plurality of bias terminals, each bias terminal configured to provide a pre-determined bias voltage to the corresponding bias electrode.

4. The optical modulator of claim 3, further comprising a voltage driver coupled to the plurality of bias terminals and configured to generate the pre-determined bias voltages.

5. The optical modulator of claim 4, wherein the voltage driver comprises a digitally controlled voltage supply circuit.

6. The optical modulator of claim 1, wherein each of at least two bias electrodes has a length along the first direction that is shorter than a length of the optical waveguide along the first direction.

7. The optical modulator of claim 1, wherein each of at least two bias electrodes comprises a contact that is directly coupled to the optical waveguide at a plurality of bias contact points arranged along the first direction.

8. The optical modulator of claim 1, wherein:
   a first bias electrode of the plurality of bias electrodes is aligned with the first point of the signal electrode along the first direction, and
   a second bias electrode of the plurality of bias electrodes is aligned with the second point of the signal electrode along the first direction.

9. The optical modulator of claim 8, wherein a third point along the length of the signal electrode is coupled to a termination resistor, and wherein
   a third bias electrode of the plurality of bias electrodes is aligned with the third point of the signal electrode along the first direction.

10. The optical modulator of claim 9, wherein a third bias voltage at the third bias electrode is selected such that an impedance of a portion of the signal electrode at the third point is matched with an impedance of the termination resistor.

11. The optical modulator of claim 10, wherein the second bias electrode has a second bias voltage, and
   a difference between the second bias voltage and the third bias voltage is selected such that a ripple amplitude at the signal input at a frequency of 5 GHz or above is decreased compared to when the difference is zero.

12. The optical modulator of claim 1, wherein the compensation circuit comprises at least one negative resistance cell.

13. The optical modulator of claim 12, wherein the at least one negative resistance cell comprises a plurality of negative resistance cells coupled to a plurality of points along the length of the signal electrode.

14. The optical modulator of claim 12, further comprising a negative resistance driver coupled to the at least one negative resistance cell and configured to supply power to the compensation circuit.

15. A silicon carrier-depletion modulator, comprising:
- a modulation driver configured to provide a modulation signal at a signal input;
- a compensation circuit, wherein the compensation circuit comprises a plurality of negative resistance cells coupled to a plurality of points along the length of the signal electrode;
- a negative resistance driver coupled to at least one negative resistance cell and configured to supply power to the compensation circuit; and
- a silicon waveguide extending along a first direction and configured to support a light signal, the silicon waveguide coupled between a signal electrode and a bias electrode,
- wherein the signal electrode is elongated along the first direction, the signal electrode having a length, the signal electrode directly coupled to the signal input at a first point along the length,
- wherein a second point along the length is coupled to the compensation circuit,
- wherein the bias electrode comprises a plurality of segments arranged along the first direction and coupled to the silicon waveguide, and
- wherein each segment has a pre-determined bias voltage configured to reduce impedance mismatches along the length of the signal electrode,
- the compensation circuit configured to reduce the attenuation of the modulation signal.

16. The silicon carrier-depletion modulator of claim 15, wherein a first segment of the plurality of segments is configured to receive a first bias voltage, and wherein a second segment of the plurality of segments is configured to receive a second bias voltage different from the first bias voltage.

17. The silicon carrier-depletion modulator of claim 15, wherein each of at least two segments is coupled to a respective bias terminal of a plurality of bias terminals, each bias terminal configured to provide a pre-determined bias voltage to the corresponding segment.

18. The silicon carrier-depletion modulator of claim 15, wherein each of at least two segments has a length along the first direction that is shorter than a length of the silicon waveguide along the first direction.

19. The silicon carrier-depletion modulator of claim 15, wherein each of at least two segments comprises a contact that is directly coupled to the silicon waveguide at a plurality of bias contact points arranged along the first direction.

20. An optical modulator, comprising:
- an optical waveguide elongated along a first direction and configured to transmit a light signal along the first direction;
- a compensation circuit;
- a signal electrode having a length, wherein the signal electrode is directly coupled to a signal input at a first point along the length, the signal input configured to receive a modulation signal, the signal electrode elongated along the first direction and coupled to the optical waveguide, wherein a second point along the length is coupled to the compensation circuit;
- a first bias electrode aligned with the first point of the signal electrode along the first direction, the first bias electrode coupled to the optical waveguide;
- a second bias electrode aligned with the second point of the signal electrode along the first direction; and
- a third bias electrode aligned with a third point of the signal electrode along the first direction, wherein the third point is coupled to a termination resistor,
- wherein the compensation circuit is configured to reduce the attenuation of the modulation signal,
- wherein a third bias voltage at the third bias electrode is selected such that an impedance of a portion of the signal electrode at the third point is matched with an impedance of the termination resistor.

* * * * *